US012470034B2

(12) United States Patent
Fassmann et al.

(10) Patent No.: US 12,470,034 B2
(45) Date of Patent: Nov. 11, 2025

(54) METHOD FOR PRODUCING A CONTACT ELEMENT FORMED AT LEAST IN SECTIONS FROM A BRASS ALLOY, AND CONTACT ELEMENT

(71) Applicant: PHOENIX CONTACT GmbH & Co. KG, Blomberg (DE)

(72) Inventors: Dennis Fassmann, Hameln (DE); Timo Köhler, Emtinghausen (DE); Dirk Basel, Horn-Bad Meinberg (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 368 days.

(21) Appl. No.: 18/017,455

(22) PCT Filed: Jul. 22, 2021

(86) PCT No.: PCT/EP2021/070600
§ 371 (c)(1),
(2) Date: Jan. 23, 2023

(87) PCT Pub. No.: WO2022/018227
PCT Pub. Date: Jan. 27, 2022

(65) Prior Publication Data

US 2024/0039226 A1 Feb. 1, 2024

(30) Foreign Application Priority Data

Jul. 24, 2020 (LU) ........................................ 101955

(51) Int. Cl.
*H01R 43/16* (2006.01)
*H01R 4/58* (2006.01)

(52) U.S. Cl.
CPC ............... *H01R 43/16* (2013.01); *H01R 4/58* (2013.01)

(58) Field of Classification Search
CPC .................................. H01R 13/16; H01R 4/58
(Continued)

(56) References Cited

U.S. PATENT DOCUMENTS

2010/0098579 A1 4/2010 Xu et al.
2011/0207363 A1* 8/2011 Shimizu ................. H01R 43/16 29/874
(Continued)

FOREIGN PATENT DOCUMENTS

CN 101295819 B * 5/2010
CN 105039777 B * 4/2018 ............... C22C 1/02
(Continued)

OTHER PUBLICATIONS

International Preliminary Report on Patentability and English translation of Written Opinion of International Searching Authority for International Application No. PCT/EP2021/070600, mailed Jan. 24, 2023 (7 pages).
(Continued)

*Primary Examiner* — Peter G Leigh
(74) *Attorney, Agent, or Firm* — ICE MILLER LLP; Justin D. Swindells

(57) ABSTRACT

A method for producing a contact element formed at least in sections from a brass alloy, and a contact element formed at least in sections from a brass alloy. In a method for producing a contact element formed at least in sections from a brass alloy, which method permits both productive and economic production of a contact element from lead-free brass alloys at least in some sections by shaping, more particularly by machining methods, and the process-safe contacting by crimping, for example of plug contacts, a blank for the contact element is first provided. Subsequently the structural state of the blank is changed by a first thermal treatment to increase the ß phase content, after which the contact element
(Continued)

Figure 1:
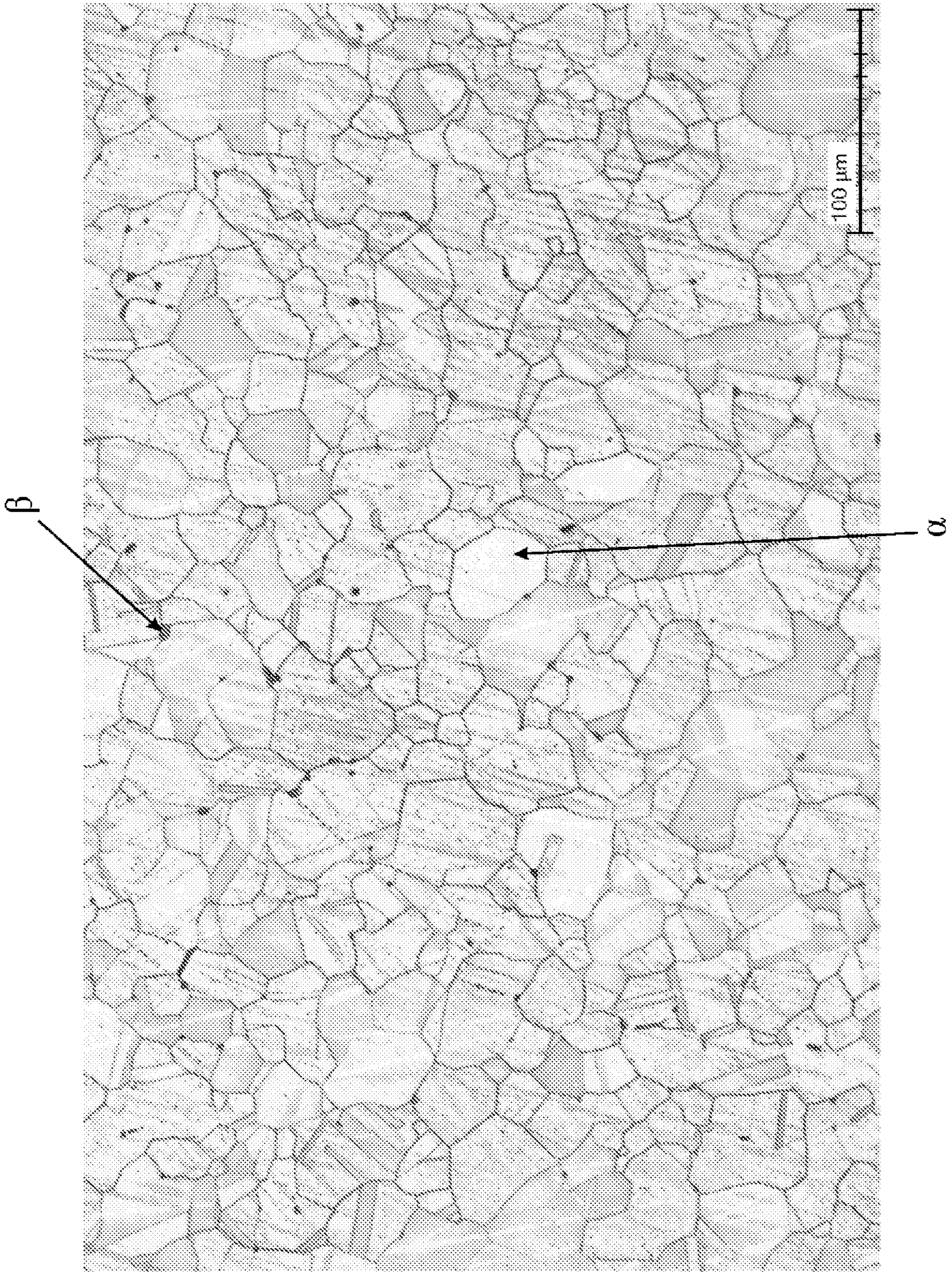

is formed from the blank with a higher ß phase content. The structural state of the contact element formed is then modified by a second thermal treatment to increase the α phase content.

12 Claims, 11 Drawing Sheets

(58) Field of Classification Search
USPC .......................................................... 439/887
See application file for complete search history.

(56) References Cited

U.S. PATENT DOCUMENTS

| | | | |
|---|---|---|---|
| 2012/0207642 | A1 | 8/2012 | Zeiger |
| 2021/0050685 | A1 | 2/2021 | Fassmann |

FOREIGN PATENT DOCUMENTS

| | | | | | |
|---|---|---|---|---|---|
| CN | 109439957 | A | * | 3/2019 | ............... C22C 1/03 |
| CN | 110421104 | A | | 11/2019 | |
| CN | 111235427 | A | * | 6/2020 | |
| DE | 102009038657 | A1 | | 2/2011 | |
| DE | 202016104552 | U1 | * | 12/2017 | ............... C22C 9/04 |
| DE | 102018100440 | A1 | | 7/2019 | |
| DE | 102018103313 | A1 | | 8/2019 | |
| JP | 2012221774 | A | * | 11/2012 | |
| JP | 2016035858 | A | * | 3/2016 | |
| JP | 6326320 | B2 | * | 5/2018 | |
| JP | 2019508584 | A | * | 3/2019 | ............... C22C 1/02 |
| KR | 20070000661 | A | * | 1/2007 | |
| WO | WO-2018033360 | A1 | * | 2/2018 | ............... C22C 9/04 |
| WO | 2019137832 | A1 | | 7/2019 | |
| WO | WO 2019/158473 | A1 | | 8/2019 | |
| WO | WO-2020088738 | A1 | * | 5/2020 | ............... C22C 9/04 |

OTHER PUBLICATIONS

International Search Report and Written Opinion of International Searching Authority for International Application No. PCT/EP2021/070600, with English translation of International Search Report, mailed Oct. 25, 2021 (12 pages).

Wang, et al.; Recent Research and Mechanism Analysis of Free-Cutting Brass; vol. 32, No. 10; Oct. 2011.

* cited by examiner

METHOD FOR PRODUCING A CONTACT ELEMENT FORMED AT LEAST IN SECTIONS FROM A BRASS ALLOY, AND CONTACT ELEMENT

CROSS-REFERENCE TO RELATED APPLICATIONS

This application is a U.S. National Stage of International Application No. PCT/EP2021/070600, filed Jul. 22, 2021, which claims the benefit of Luxembourg Patent Application No. LU101955, filed Jul. 24, 2020, both of which are incorporated herein by reference in their entireties.

The invention relates to a method for producing a contact element formed at least sectionally from a brass alloy, and to a contact element made from a brass alloy.

Electrical contact elements and in particular electrical plug-in contacts made of brass alloys are usually produced by machining. To optimize the machining process, brass alloys containing lead are used for this purpose. This lead content leads to good chip breaking and low cutting forces, which significantly facilitates the production process and increases the tool life. By adding lead, it is also possible to machine pure α-brass alloys cost-effectively. An example of this is the brass alloy CuZn35Pb2.

The advantage of such leaded brass alloys is the combination of two opposing properties: On the one hand, the lead content makes machining possible, and on the other hand, a pure α-microstructure can be present in such a lead-containing brass alloy, which exhibits very good formability and therefore makes subsequent forming, in particular crimping, of the contact element particularly easy.

Despite the positive properties of lead, there are efforts to replace lead as a machining additive in brass alloys, supported inter alia by the EU directives—Directive 2000/53/EC on end-of-life vehicles, Directive 2002/96/EC on waste electrical and electronic equipment, and Directive 2011/65/EU on the use of hazardous substances in electrical and electronic equipment. However, if the lead content is dispensed with due to legal restrictions, it is very difficult to machine the material, especially since very long flowing chips are formed in the process.

Lead-free brass alloys for machining, on the other hand, typically have higher zinc contents, such as CuZn40 or CuZn42. The higher zinc content stabilizes the ß-phase which is characterized by good machinability since the ß-phase promotes chip breaking. At the same time, however, the ß-phase is extremely brittle and can therefore only be formed to a very limited extent, as is necessary when crimping electrical contact elements.

To produce a lead-free electrical contact element, in particular a lead-free crimp contact, from a brass alloy, there are therefore conflicting requirements. On the one hand, the material of the contact element should be brittle to allow good machining. On the other hand, the material should be readily cold-formable to enable connection by crimping. The process windows for such contact elements are therefore very narrow, since too low α-microstructure content makes crimping impossible, and too high α-microstructure content makes the machining process so difficult that producing the contact element becomes uneconomical.

From DE 10 2009 038 657 A1, a lead-free brass alloy is already known which achieves good machinability by adding several additional alloy components, which results in the formation of an α/ß solid solution. However, such a material has neither ideal properties for machining, nor for forming by crimping. In addition, the precise producing of the alloy from numerous components is complex and expensive.

The invention is therefore based on the object of providing a method that enables both productive and cost-effective producing of a contact element from lead-free brass alloys by means of shaping, in particular by machining processes, and process-reliably contacting by means of crimping, for example of plug-in contacts. Furthermore, it is an object of the invention to propose a method for producing a contact element without the use of a portion of ecologically harmful alloying elements.

According to the invention, the object is achieved by a method according to claim 1, and by a contact element according to claim 9. Advantageous developments of the invention are indicated in the dependent claims.

In the method according to the invention for producing a contact element formed at least sectionally from a brass alloy, a blank for the contact element is first provided and, in particular, a starting material for the blank or the contact element is selected, wherein the microstructure of said blank is subsequently changed by means of a first heat treatment to increase the ß-phase content, after which the contact element is formed from the blank with an increased ß-phase content. Finally, a change in the microstructure of the formed contact element is made by means of a second heat treatment to increase the α-phase content. Increasing a phase content is generally understood to mean an increase in the respective portion in terms of quantity and/or area.

Furthermore, the invention relates to a contact element made of a brass alloy, in particular a socket contact with an over-spring, which has been produced according to the method according to the invention.

The inventors have recognized that a microstructure constellation adapted to the particular requirement is advantageous, and that such a change of the microstructure can be economically integrated into the manufacturing process of a contact element by means of a heat treatment. For machining, the aim is to achieve as high a ß content as possible since this ensures good chip breaking and economically machining, whereas for subsequent crimping, the highest possible α content is required to give the contact element ductile properties and enable cold forming during the crimping process without cracking.

Accordingly, it is advantageously possible to crimp contact elements produced in this way, wherein the low strength in the crimping area enables low transition resistances, and crack formation during the crimping process can be largely excluded. The method according to the invention therefore enables to produce contact elements from lead-free brass alloys by shaping, in particular by machining processes, wherein the properties of the obtained contact element are also very good for subsequent crimping.

According to the invention, a contact element is produced, wherein a contact element can in principle be any component or assembly for producing an electrical contact, in particular between an electrical line and a further component. For this purpose, the contact element comprises at least one metallic section, wherein the contact element can be formed entirely from metal. In addition, the contact element may have a housing made of an insulator, for example a plastic, or it may merely have at least one contact area formed of metal. Preferably, the contact element is a plug-in contact and particularly preferably a socket contact, in particular with an over-spring.

According to the invention, the contact element is formed at least sectionally from a brass alloy, wherein preferably at least a base body and particularly preferably the entire contact element is formed essentially from the brass alloy. In this context, a brass alloy is initially understood to be any copper alloy which has a zinc mass fraction of up to 50%, wherein copper simultaneously forms the main component, and zinc forms the second main component. In addition, other metals may be contained in the brass alloy, but their mass fraction is preferably less than 10%, and particularly preferably less than 5%.

The brass alloy has a microstructure which includes an α-crystal portion and a ß-crystal portion, and optionally also a portion of the corresponding solid solutions. The α-crystal of copper and zinc, also referred to as α-phase, exhibits a face-centered cubic structure. The ß-phase or ß-crystal exhibits a body-centered cubic structure. The microstructure can be significantly influenced by the composition of the alloy and by the temperature or heat treatment.

According to the invention, the microstructure of the brass alloy is to be changed twice, in each case by a heat treatment, wherein by means of the first heat treatment, the portion of the β-phase in the microstructure or the β-phase portion in a solid solution is to be increased or adjusted to be as large as possible, whereas by means of the second heat treatment a larger, in particular the largest possible α-phase portion is to be achieved, wherein an α-phase portion of over 30% has already proved to be advantageous, and an α-phase portion of over 50% is most preferred. Accordingly, a change in the microstructure state is understood to mean in particular a shift in the phase contents. However, a change in the phase state can also be, for example, a reduction in concentration differences, a change in the grain size in the material, in particular grain refinement, and/or a reduction in stresses or defects. To change the microstructural, in particular a heat treatment is carried out to increase the particular phase fraction compared with the initial state before the particular heat treatment, wherein the brass alloy is heated at least sectionally to a temperature which is higher than the initial temperature.

Initially, each of the heat treatments can be of any desired design and, in particular, can have any desired temperature profile. Preferably, a heat treatment is carried out by heating to a fixed temperature, holding at this temperature for a period of time, and subsequently cooling. Such a heating cycle is preferably carried out only once, although it is also possible in principle to repeat it several times. Furthermore, heating is preferably performed uniformly and/or uninterruptedly up to the fixed temperature. Heating takes place particularly preferred at a heating rate of at least 2 K/min, most particularly preferred at least 4 K/min, and especially preferred at least 10 K/min. Cooling also preferably takes place uninterruptedly and in particular preferably down to the initial temperature before the heat treatment.

The blank can be any workpiece made of the brass alloy, wherein the blank is preferably a semi-finished product, in particular preferably a bar material, or is formed from turning bars, from wires or the like made of the brass alloy. Due to the production process and in particular the technically normal cooling rate in the process, the delivery state of the starting material or the blank is typically characterized by a very high α-microstructure content or even a pure α-microstructure. Preferably, the starting material or the blank also has a ß-microstructure content, wherein the starting material for the blank or the contact element is selected particularly preferably on the basis of the microstructure content, in particular a ß-microstructure content in addition to the α-structure.

According to the invention, the contact element is formed by machining the blank, wherein forming by shaping, in particular by machining methods and most preferably exclusively by machining, is preferred. Forming the contact element is in principle understood to mean any method of shaping. Forming by turning or by means of an automatic lathe is particularly preferred. Forming is also preferably carried out without heating the blank and in particular without intermediate annealing between individual forming steps.

A preferred embodiment of the method according to the invention provides that the first heat treatment for forming an increased ß-phase content comprises heating the blank to a temperature between 600° C. and 900° C., preferably between 750° C. and 880° C., particularly preferably between 800° C. and 850° C., and is preferably carried out exclusively by heating, in particular a single heating step. Likewise, it is preferred that the second heat treatment for forming an increased α-phase content comprises heating the formed contact element to a temperature between 300° C. and 600° C., preferably between 400° C. and 500° C., particularly preferably to 450° C., and is preferably performed exclusively by heating, particularly a single heating. In particular, the formed contact element is preferably heated during the second heat treatment to a lower temperature compared to the first heat treatment, preferably at least 50 K lower, more preferably at least 100 K lower, and most preferably 150 K lower.

Particularly preferably, the first heat treatment and/or the second heat treatment is performed by continuous heating to a target temperature followed by cooling back to ambient temperature. Also preferably, the blank is kept at a temperature for a predetermined duration during the first heat treatment, and/or the contact element is kept at a temperature for a predetermined duration during the second heat treatment, wherein the duration can in principle be freely selected. Preferably, however, this duration is between ten seconds and ten hours, particularly preferably between ten minutes and five hours, most preferably between 15 minutes and three hours, and especially preferably between 30 minutes and two hours. In principle, different durations can be selected for the first and second heat treatments.

The duration of the heat treatment also depends, among other things, on the number of contact elements treated at the same time, wherein a longer duration of the heat treatment is preferred in particular when treating numerous parts at the same time, for example in a mesh box or crate, in order to ensure that internal parts have also been heated for a sufficient duration. Accordingly, heat treatment of individual contact elements or individually arranged contact elements can be for a much shorter time. In general, the heat treatment takes place preferably in a continuous furnace. With regard to the duration of the heat treatment, the longer the treatment, the better the reproducibility of the desired result, in particular over all contact elements heated at the same time.

In an advantageous further development of the method according to the invention, rapid cooling takes place during the first heat treatment and/or during the second heat treatment, preferably within less than 30 s, particularly preferably within less than 15 s and most preferably within less than 5 s. Rapid cooling is initially understood to mean only cooling that is faster than cooling in ambient air, preferably using a quenching agent as a cooling medium, for example water, oil, another liquid or a cooled and/or accelerated gas stream, in particular air. Most preferably, cooling is achieved by immersion in a cooling medium. Alternatively or additionally, cooling can also be performed by contact with a significantly colder surface, wherein the specified maximum cooling time must still be observed. When a gas, in particular compressed air, is used as a quenchant, the cooling rate is preferably at least 10 K/s, particularly preferably at least 20 K/s, and most preferably at least 30 K/s. When a liquid quenchant, in particular mineral oil or water, is used, the cooling rate is preferably at least 150 K/s, particularly preferably at least 200 K/s, and most preferably at least 300 K/s. However, the cooling does not have to take place completely to room temperature in the specified time, but is preferably at least to below a temperature of 200° C., particularly preferably below 150° C., most preferably below 100° C., and especially preferably below 50° C. Preferably, the second heat treatment is carried out in such a way, and in particular for such a long time, that the α-phase content is greater than 50%, more preferably greater than 70%, and most preferably greater than 80%.

As an alternative to the strong heating, the first heat treatment for forming an increased ß-phase content can also be carried out by aging at temperatures between 150° C. and 400° C., preferably between 200° C. and 350° C. and most preferably between 200° C. and 300° C. and/or for a duration of at least 15 minutes, preferably at least 30 minutes, particularly preferably at least 60 minutes and most preferably at least 120 minutes. Furthermore, it is preferred that only a single heating step takes place. Particularly preferably, in one possible embodiment of the method according to the invention, the first heat treatment is carried out exclusively by an aging process.

In addition, however, it is also conceivable that an aging process takes place before and/or after heating to significantly higher temperatures, wherein cooling to ambient temperature can occur in the meantime, but not necessarily. Also preferably, the temperature is maintained at the specified temperature interval and in particular at one temperature during the entire aging process. Alternatively, however, multiple heating and cooling, in particular within the limits of the specified temperature interval, is also conceivable.

For ecological as well as regulatory reasons, it is further preferred that the brass alloy of the blank and/or of the contact element comprises a lead content s 0.5%, preferably ≤0.3%, particularly preferably s 0.1% and most preferably s 0.01% based on the mass, and in particular preferably contains no lead or is lead-free, wherein a lead-free alloy is understood to mean an alloy to which no lead has been added and/or which—apart from unavoidable impurities—contains no lead. Particularly preferably, the brass alloy does not contain a determinable lead content.

Although a workpiece made of any brass alloy can be used as the blank, in an advantageous further development of the method according to the invention, the brass alloy has a copper mass fraction of at least 50% and/or a zinc mass fraction of at least 35%, preferably between 35% and 50%, particularly preferably between 36% and 42% and most preferably between 38% and 42% and/or residual components of less than 5%, preferably less than 3%, particularly preferably less than 1%, and most preferably less than 0.5%.

Finally, a contact element produced by means of the method according to the invention is preferred which has at least one area for cold forming, in particular a crimping area, of the brass alloy for receiving a conductor as well as for fixing the conductor by cold forming or crimping, wherein the area for cold forming preferably has an increased α-phase content of the brass alloy, in particular a higher α-phase content than a β-phase content.

Figure 2:
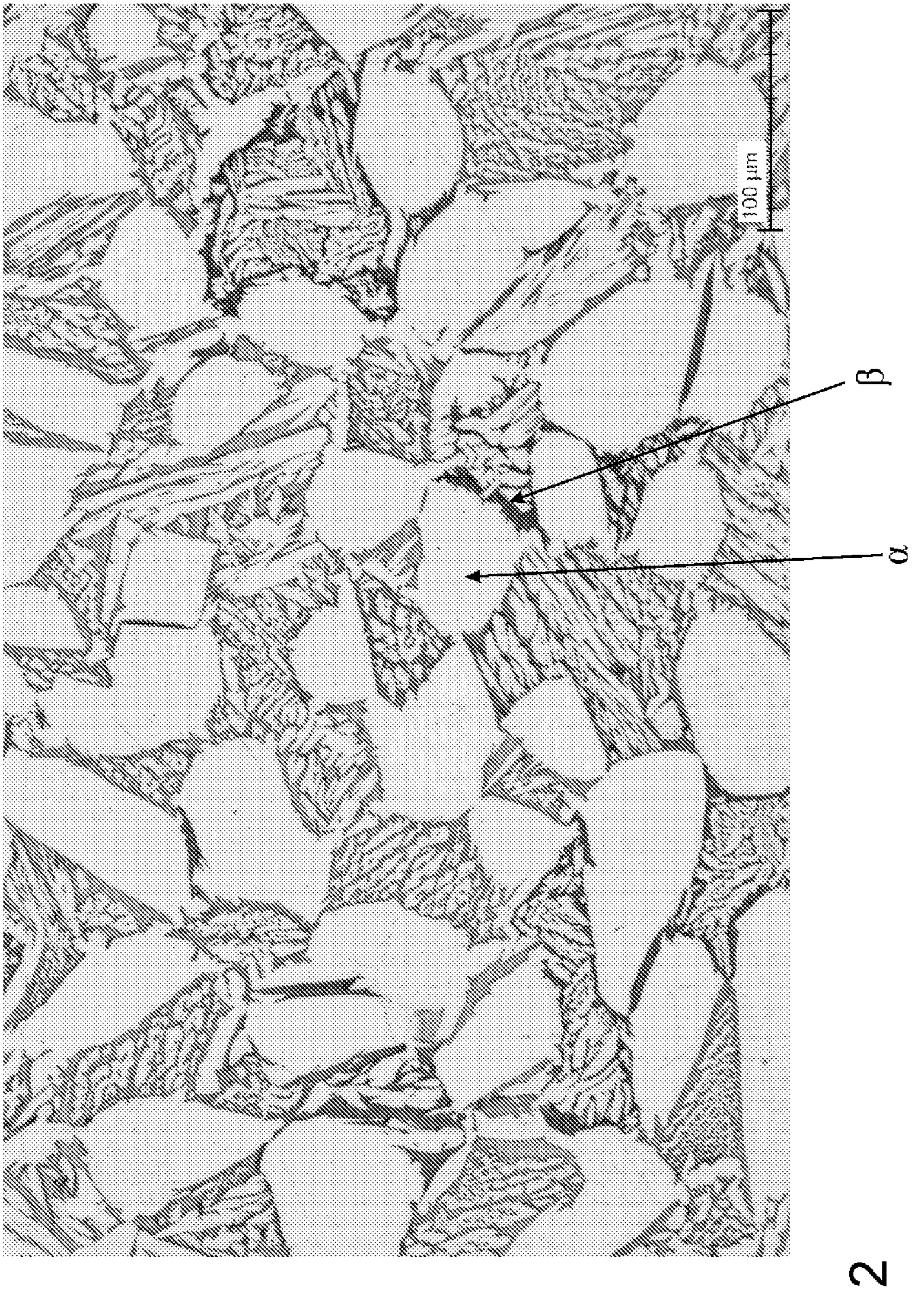
Figure 3:
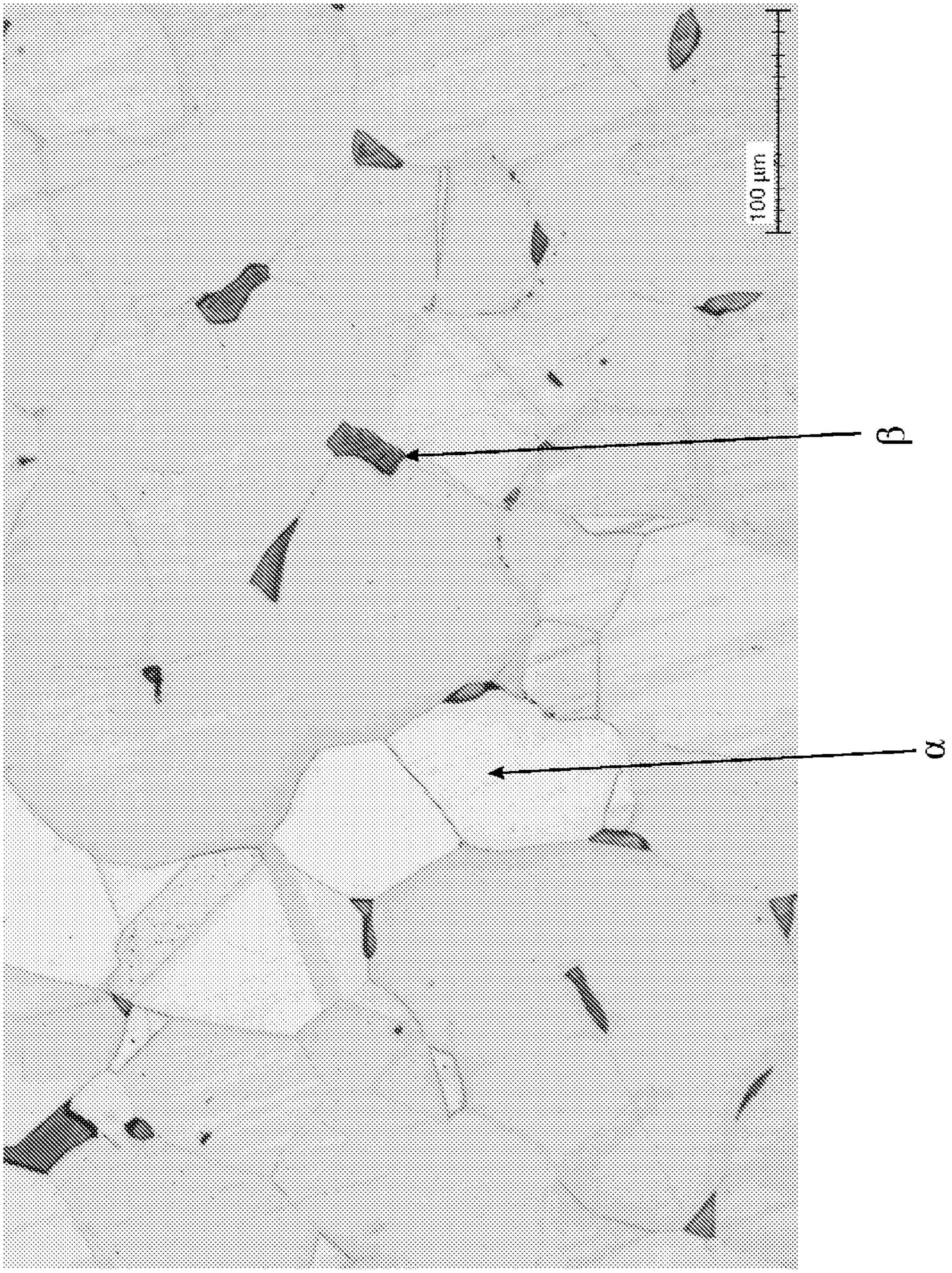
Figure 4:
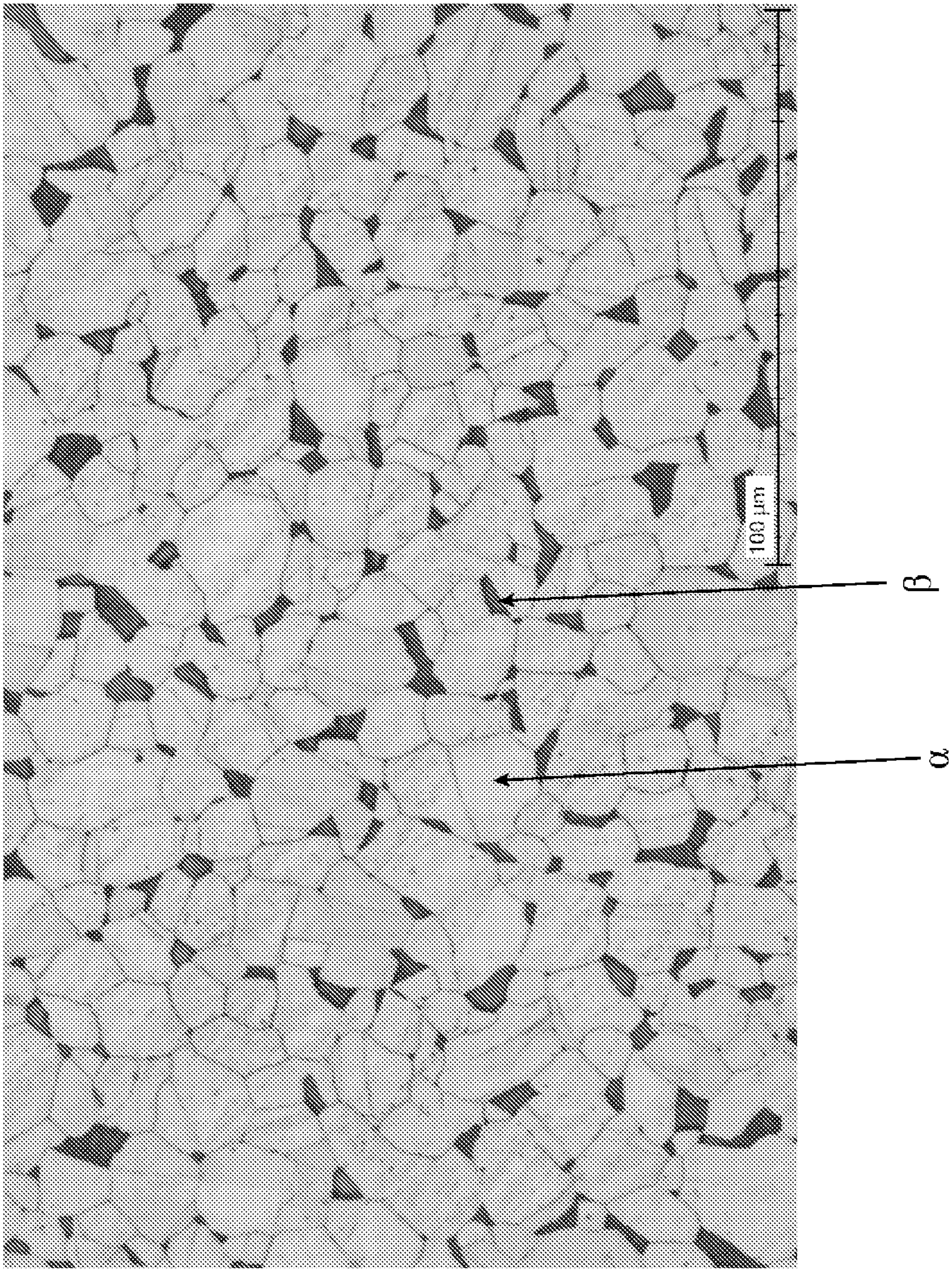
Figure 5:
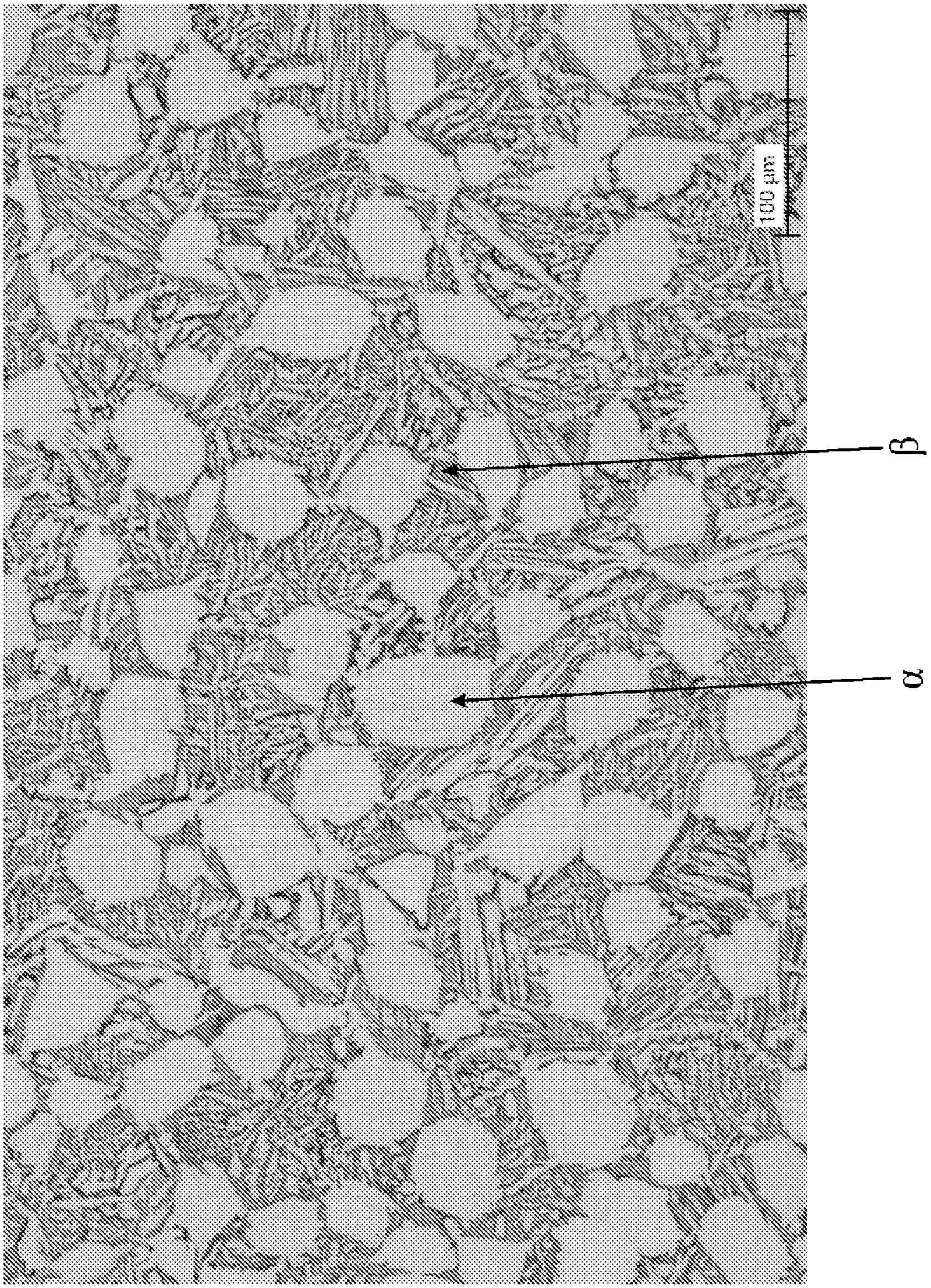
Figure 6:
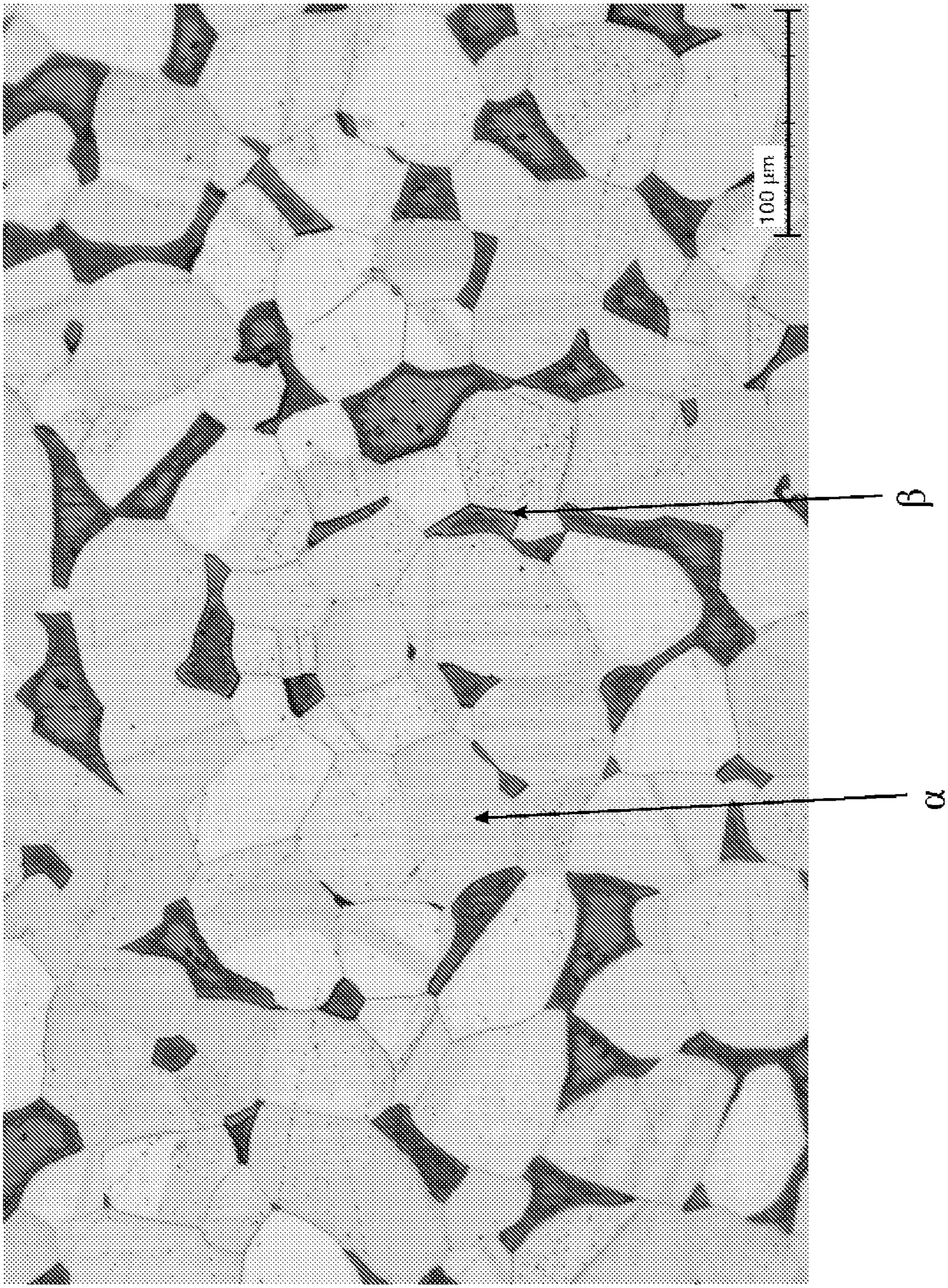
Figure 7:
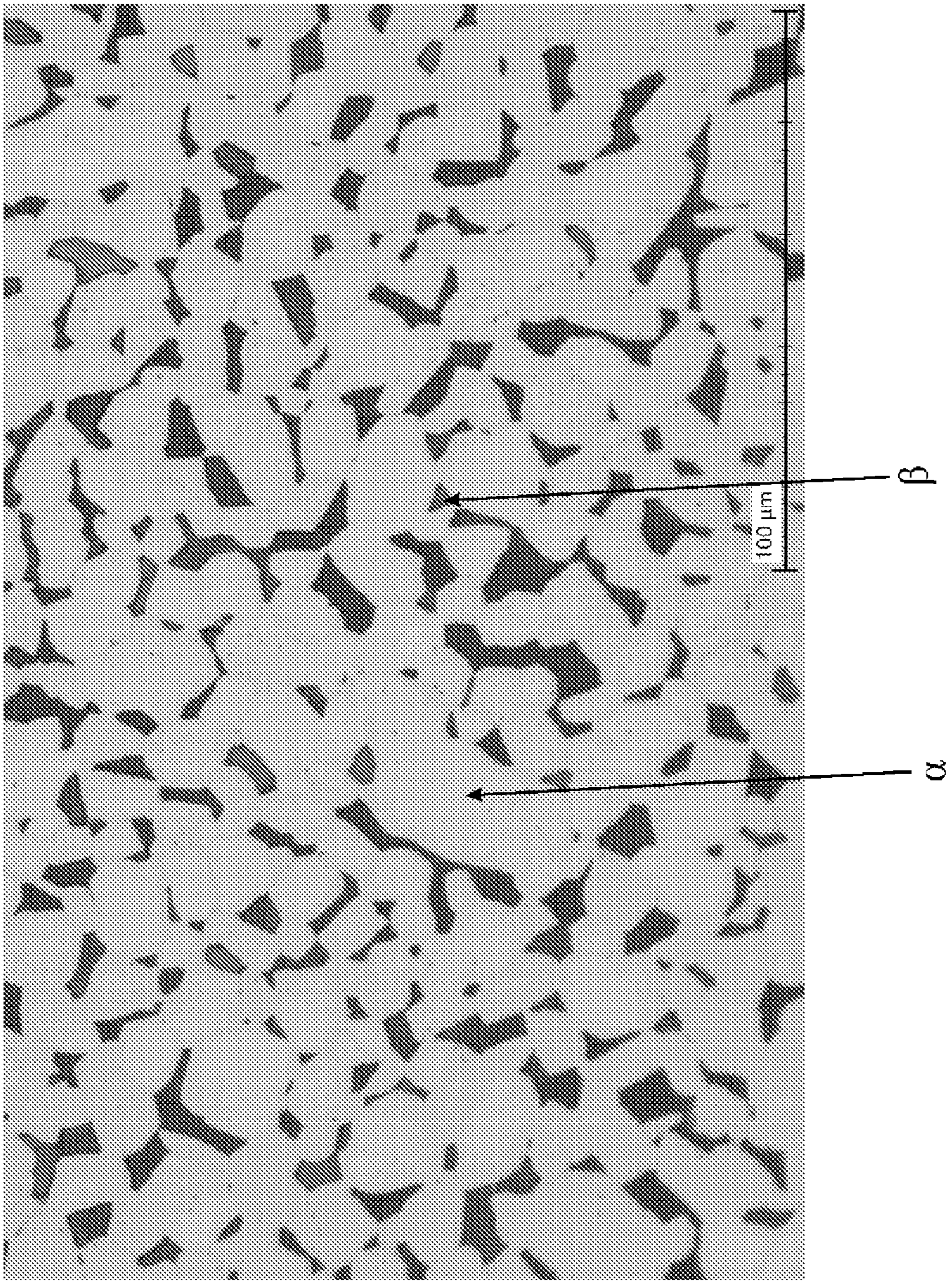
Figure 8:
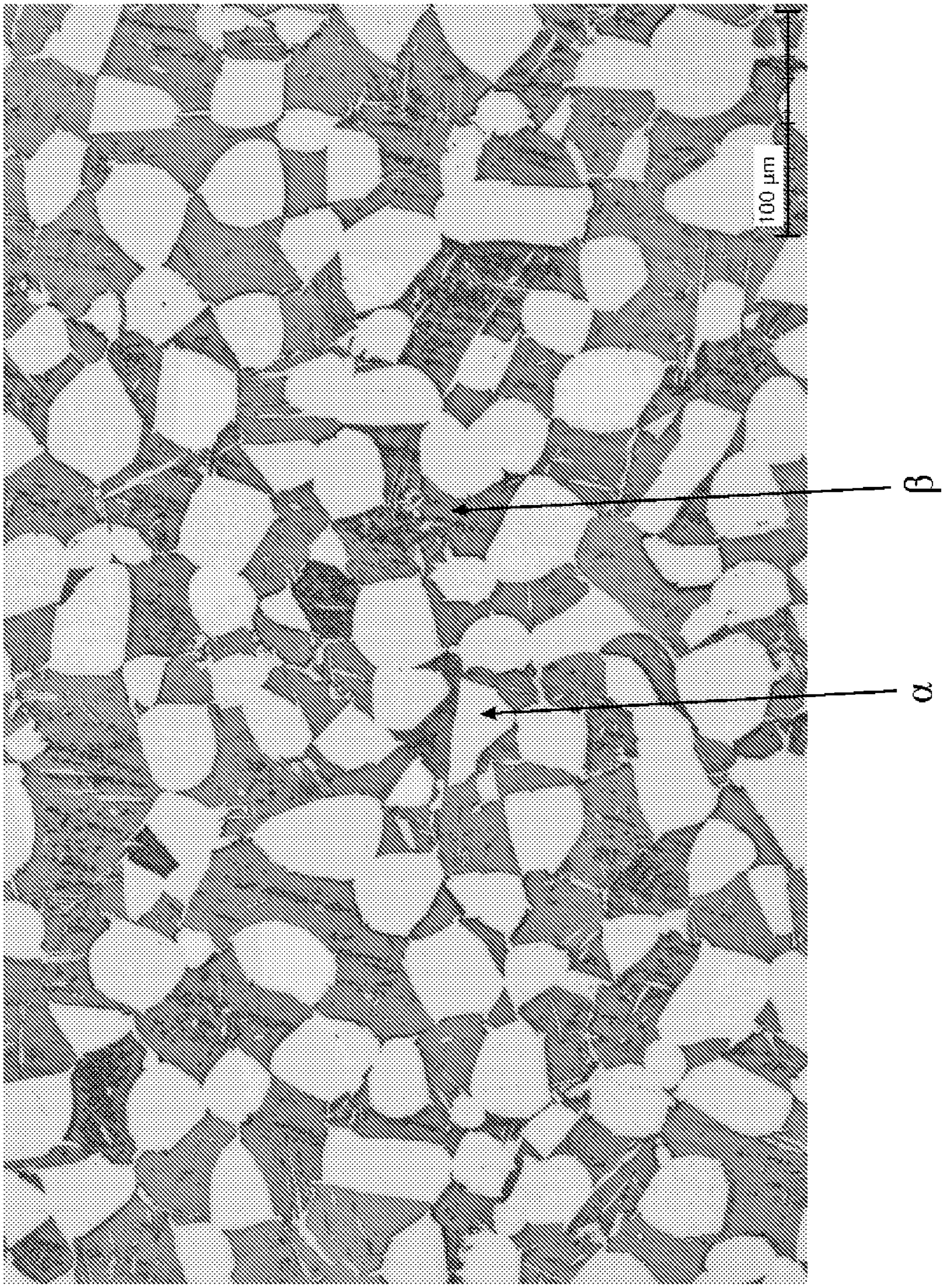
Figure 9:
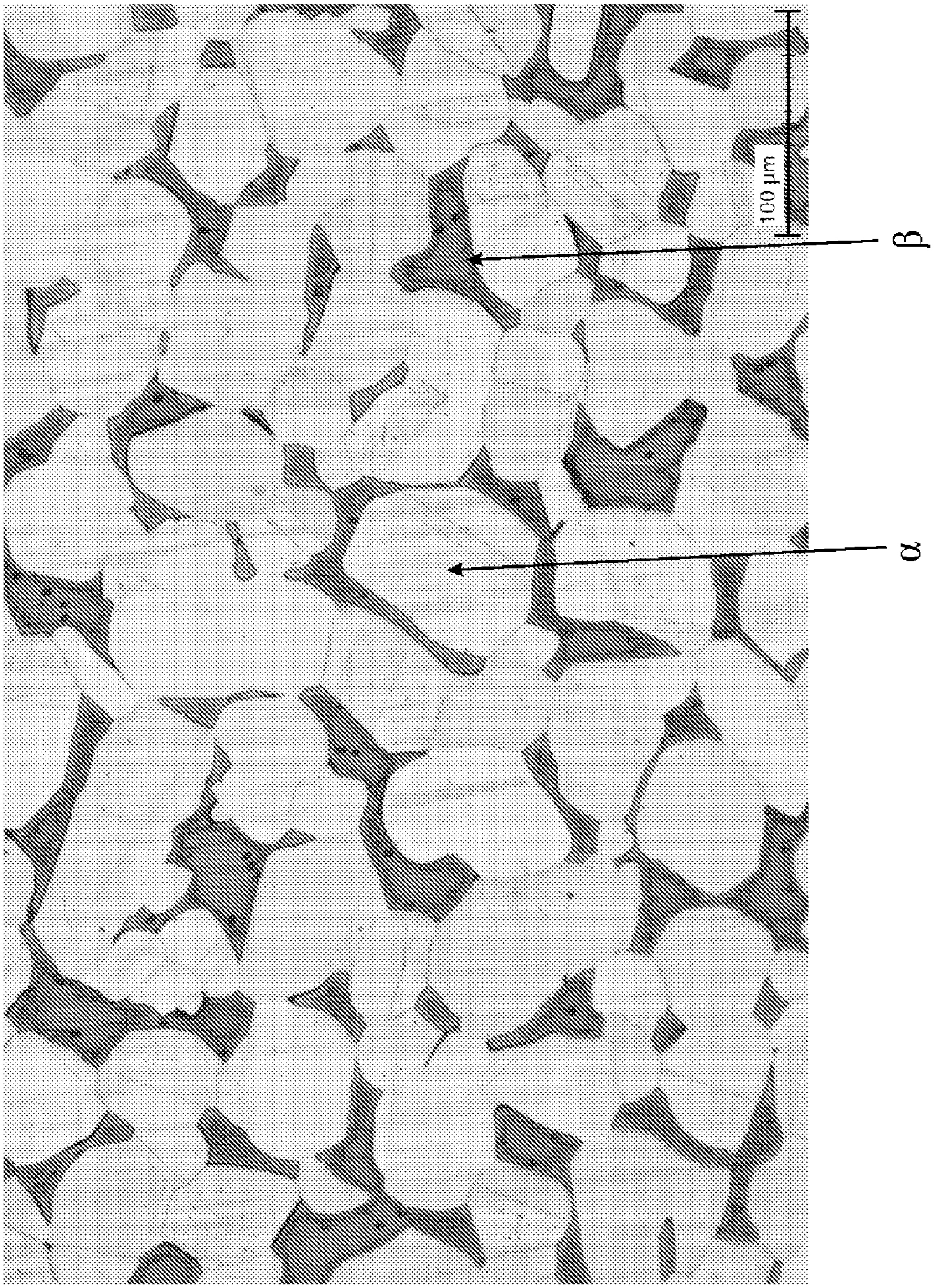
Figure 10:
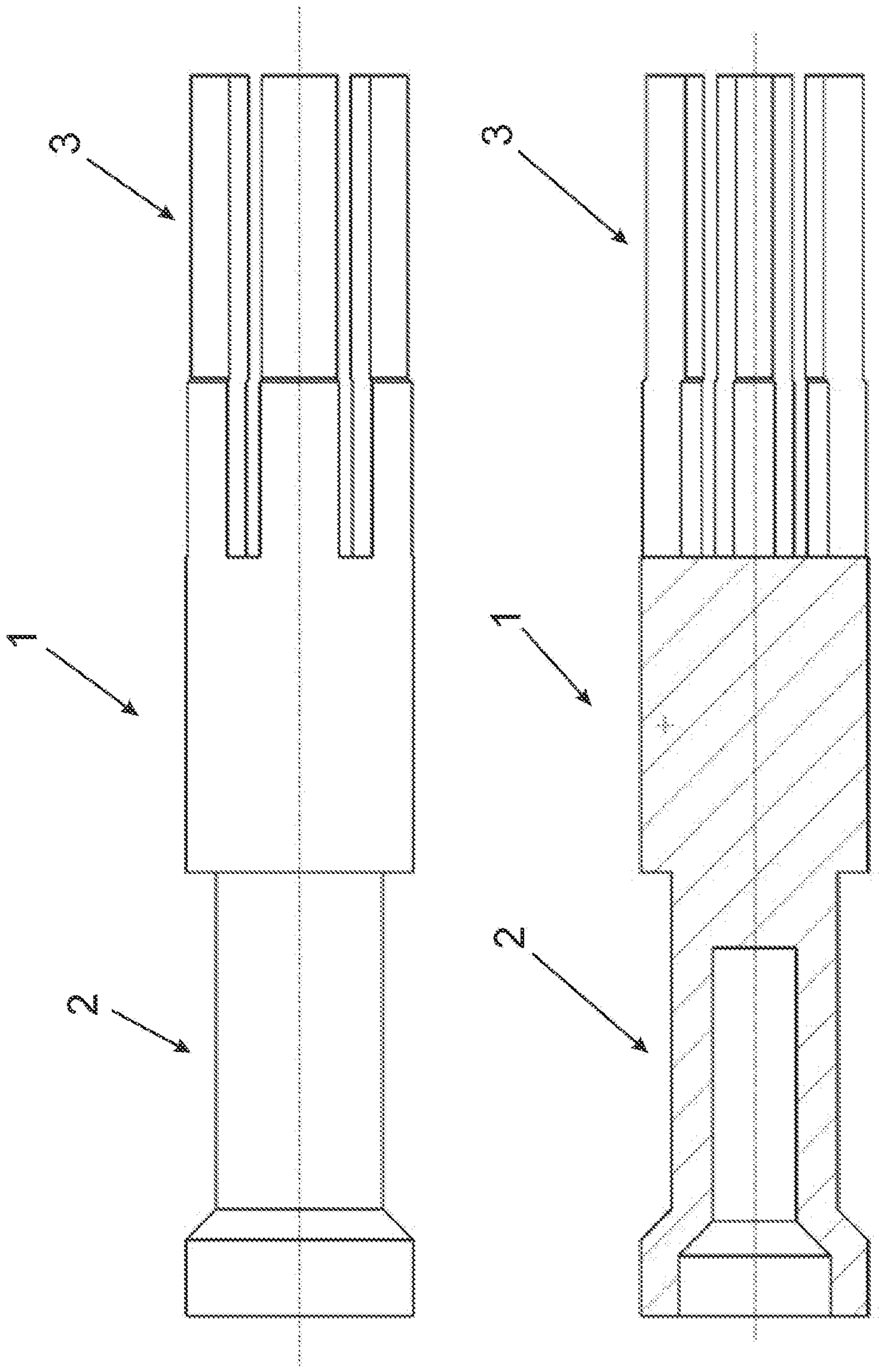
Figure 11:
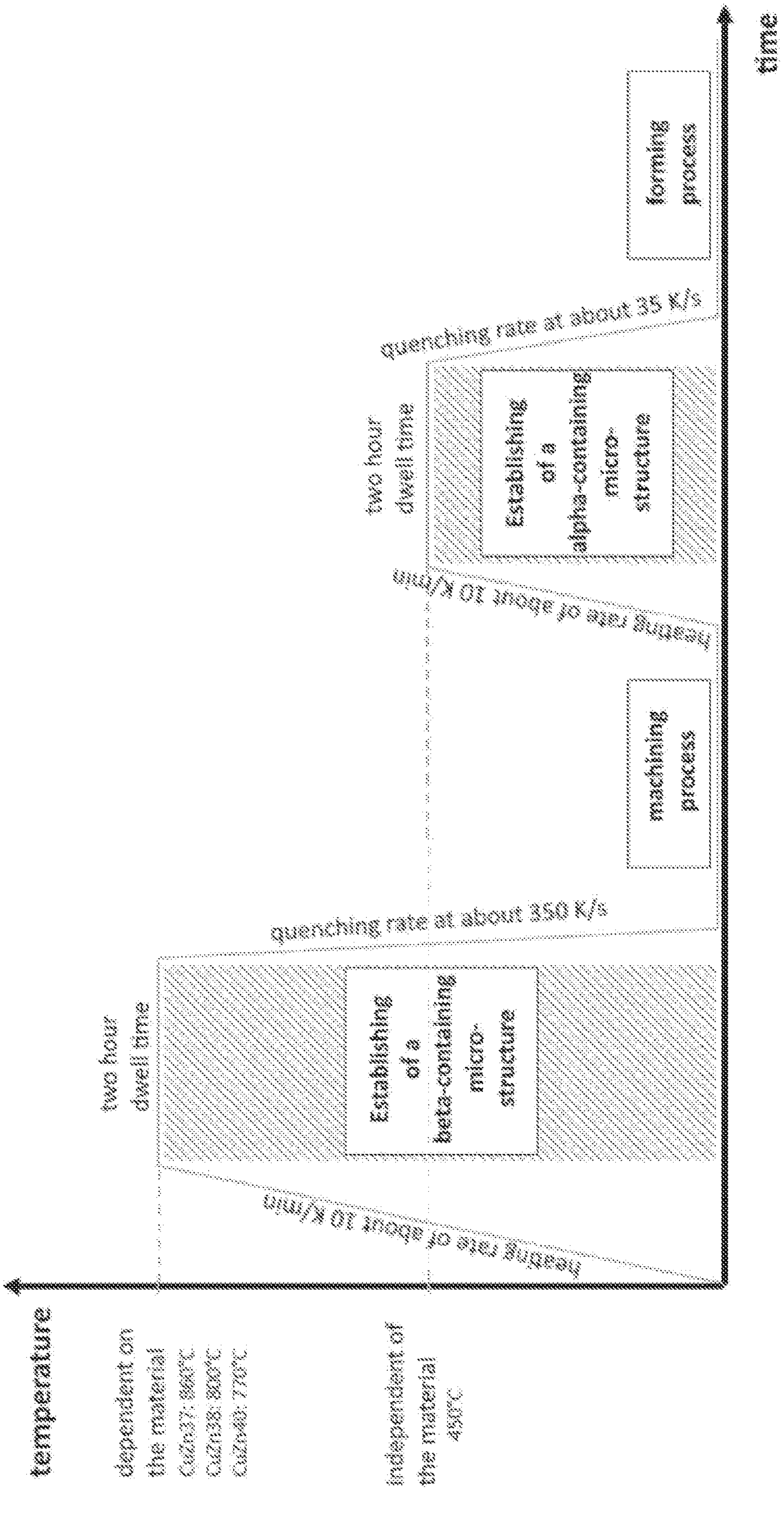

Several embodiments of the invention are described in more detail below with reference to the figures. The figures show:

FIG. 1 A microstructure of CuZn37 in the as-received state with a high α-phase content, FIG. 2 A microstructure of the CuZn37 shown in FIG. 1 after a first heat treatment in the machining state with an increased β-phase content, FIG. 3 A microstructure of the CuZn37 shown in FIG. 1 after a second heat treatment in the cold forming state with a high α-phase content, FIG. 4 A microstructure of CuZn38 in the as-received state with a high α-phase content, FIG. 5 A microstructure of the CuZn38 shown in FIG. 4 after a first heat treatment in the machining state with an increased β-phase content, FIG. 6 A microstructure of the CuZn38 shown in FIG. 4 after a second heat treatment in the cold forming state with a high α-phase content, FIG. 7 A microstructure of CuZn40 in the as-received state with a high α-phase content, FIG. 8 A microstructure of the CuZn40 shown in FIG. 7 after a first heat treatment in the machining state with an increased β-phase content, FIG. 9 A microstructure of the CuZn40 shown in FIG. 7 after a second heat treatment in the cold working state with a high α-phase content, FIG. 10 A schematic view of a contact element, and FIG. 11 A schematic flow diagram of a method for producing a contact element formed at least sectionally from a brass alloy.

In a first embodiment of the method for producing a contact element 1 formed at least sectionally from a brass alloy, a bar material of lead-free CuZn37 is selected as the starting material for a blank which has been produced at a normal cooling rate and therefore has an almost pure α-structure, as shown in FIG. 1.

In order to significantly improve machinability, a first heat treatment is carried out in which the blank is heated once at a heating rate of 10 K/min to a temperature of 860° C. and held there for 2 hours (see FIG. 11) to ensure recrystallization and a shift of the phase contents from the α-microstructure to a ß-microstructure, as shown in FIG. 2. Subsequently, the blank is rapidly cooled by quenching in water, in particular at a cooling rate in the range around 350 K/s to stabilize a high ß-phase content by quenching.

The contact element 1 is then formed from the blank by means of a shaping process, in particular by means of a machining process, wherein advantageously the breaking of the chip is enhanced by the high ß-phase content (see FIG. 2).

In order to finally produce the crimpability of the contact element 1 and prevent cracking during crimping, a second heat treatment is carried out by heating at a heating rate of 10 K/min to a temperature of 450° C., subsequently holding for 2 hours (see FIG. 11) to allow recrystallization and a shift of the phase contents from the ß-microstructure to an α-microstructure or to solid solutions with a high α-microstructure fraction (see FIG. 3), and finally a rapid cooling in moving air, in particular with a cooling rate in the range around about 35 K/s to stabilize the α-microstructure.

A further embodiment of the method for producing a contact element 1 formed at least sectionally from a brass alloy differs significantly from the first embodiment in the selected starting material of the blank, wherein lead-free CuZn38 is used in the form of a bar material which has a high α-microstructure content in the initial state (see FIG. 4). In addition, the first heat treatment is carried out at a lower temperature of only 800° C. also for a period of 2 hours, which also results in a significantly increased ß-microstructure content (see FIG. 5). After holding at this temperature and quenching in water again, the contact element 1 is also formed by machining. Finally, the produced contact element 1 is treated by artificial aging at 450° C. for 2 hours as part of a second heat treatment to change the microstructure to a significantly increased α-microstructure fraction (see FIG. 6) to establish good crimpability. Cooling is carried out again in moving air at a cooling rate of about 35 K/s.

In a third embodiment of the method for producing a contact element 1 formed at least sectionally from a brass alloy, a bar material made of lead-free CuZn40 with a high α-microstructure content is selected as the starting material as shown in FIG. 7, wherein the further production is largely identical to that of the second embodiment, only with a different temperature of 770° C. for the first heat treatment, which yields a significantly increased ß-microstructure content (see FIG. 8). By means of a second heat treatment, the α-microstructure content is again increased (see FIG. 9) to improve cold formability.

A contact element 1 shown in FIG. 10 in side view (FIG. 10, top) and in section (FIG. 10, bottom) has a cold-formable crimping area 2 at one end for receiving and securing an electrical conductor. At the opposite end, on the other hand, the contact element 1 has a contact area 3 for electrically connecting the contact element 1 to a corresponding further contact element.

The invention claimed is:

1. A method for producing a contact element formed at least sectionally from a brass alloy, having the steps of:
- providing a blank for the contact element formed at least sectionally from a brass alloy having a lead content ≤0.5%,
- changing the microstructure of the blank by a first heat treatment to increase the ß-phase content,
- forming the contact element from the blank with a higher ß-phase content, and
- changing the microstructure of the formed contact element by a second heat treatment to increase the α-phase content.

2. The method for producing a contact element formed at least sectionally from a brass alloy according to claim 1, wherein the first heat treatment for forming an increased ß-phase content is carried out by heating the blank to a temperature between 750° C. and 880° C.

3. The method for producing a contact element formed at least sectionally from a brass alloy according to claim 1, wherein the second heat treatment to form an increased α-phase content is carried out by heating the formed contact element to a temperature between 300° C. and 600° C.

4. The method for producing a contact element formed at least sectionally from a brass alloy according to claim 3, wherein the first heat treatment for forming an increased ß-phase content is carried out by aging at temperatures between 150° C. and 400° C., or between 200° C. and 350° C., or between 200° C. and 300° C. and/or for a duration of at least 15 minutes, or for at least 30 minutes, or for at least 60 minutes, or for at least 120 minutes.

5. The method for producing a contact element formed at least sectionally from a brass alloy according to claim 1, wherein, in the first heat treatment and/or in the second heat treatment, rapid cooling takes place within less than 15 s.

6. The method for producing a contact element formed at least sectionally from a brass alloy according to claim 5, wherein the first heat treatment for forming an increased ß-phase content is carried out by aging at temperatures between 150° C. and 400° C., or between 200° C. and 350° C., or between 200° C. and 300° C. and/or for a duration of at least 15 minutes, or for at least 30 minutes, or for at least 60 minutes, or for at least 120 minutes.

7. The method for producing a contact element formed at least sectionally from a brass alloy according to claim 1, wherein the first heat treatment for forming an increased ß-phase content is carried out by aging at temperatures between 150° C. and 400° C., or between 200° C. and 350° C., or between 200° C. and 300° C. and/or for a duration of at least 15 minutes, or for at least 30 minutes, or for at least 60 minutes, or for at least 120 minutes.

8. The method for producing a contact element formed at least sectionally from a brass alloy according to claim 1, wherein the brass alloy has a lead content ≤0.3%, or ≤0.1%, or ≤0.01%.

9. The method for producing a contact element formed at least sectionally from a brass alloy according to claim 1, wherein the brass alloy has a copper content of at least 50%, and/or a zinc content of between 36% and 42%, and residual components of less than 1%.

10. The method for producing a contact element formed at least sectionally from a brass alloy according claim 1, wherein the contact element is formed from the blank by a shaping process.

11. A brass alloy contact element produced by a method according to claim 1.

12. A contact element according to claim 11, characterized by an area for cold forming of the brass alloy for receiving a conductor and for fixing the conductor by cold forming or crimping.

* * * * *